(12) United States Patent
Hunter et al.

(10) Patent No.: US 11,299,256 B2
(45) Date of Patent: Apr. 12, 2022

(54) FLAP LEVER

(71) Applicant: Textron Aviation Inc., Wichita, KS (US)

(72) Inventors: Mark Sheridan Hunter, Colwich, KS (US); Ronald J. Parker, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 209 days.

(21) Appl. No.: 16/874,947

(22) Filed: May 15, 2020

(65) Prior Publication Data

US 2020/0361593 A1    Nov. 19, 2020

Related U.S. Application Data

(60) Provisional application No. 62/848,031, filed on May 15, 2019.

(51) Int. Cl.
*B64C 13/04* (2006.01)
*B64C 13/14* (2006.01)

(52) U.S. Cl.
CPC .......... *B64C 13/0425* (2018.01); *B64C 13/14* (2013.01)

(58) Field of Classification Search
CPC ............................ B64C 13/0425; B64C 13/14
See application file for complete search history.

(56) References Cited

U.S. PATENT DOCUMENTS

| | | | | |
|---|---|---|---|---|
| 1,987,066 A | * | 1/1935 | Kingston | B64D 31/04 244/234 |
| 4,154,415 A | * | 5/1979 | Harris | B64C 13/02 244/233 |
| 6,804,586 B2 | * | 10/2004 | Richter | G05G 1/04 244/89 |
| 9,327,826 B2 | * | 5/2016 | Nieman | B64C 13/0425 |
| 9,771,143 B2 | * | 9/2017 | Crandall-Seibert | B64C 13/0425 |
| 10,031,546 B2 | * | 7/2018 | Crandall-Seibert | B64C 13/042 |
| 2004/0128038 A1 | * | 7/2004 | Richter | G05G 9/00 701/16 |
| 2016/0083078 A1 | * | 3/2016 | Crandall-Seibert | G05G 5/06 74/523 |
| 2018/0017987 A1 | * | 1/2018 | Crandall-Seibert | B64C 13/14 |

* cited by examiner

*Primary Examiner* — Justin M Benedik
(74) *Attorney, Agent, or Firm* — Erise IP, P.A.

(57) ABSTRACT

An aircraft flap lever is disclosed. The lever is included in a housing, and is supported on an axle. The lever also has a protruding pin that is biased upwards towards four optional radially-spaced notches. Each notch results in a different lever setting, and thus different flap position. The system includes a rocker mechanism that is pivotally mounted on the axle, and prevents skipping over notches when the lever is activated.

20 Claims, 7 Drawing Sheets

FLAP LEVER

RELATED APPLICATIONS

This application claims the benefit of U.S. Provisional Application No. 62/848,031 filed May 15, 2019, the entire contents of which are herein incorporated by reference.

BACKGROUND

1. Technical Field

This disclosure relates to aircraft control surface control systems, and, more particularly, to flap control arrangements including levers.

2. Discussion of Related Art

In some aircraft, it is common to control the position of wing flaps using a flap control lever. The lever is normally located in the center pedestal in the cockpit of the aircraft. In some aircraft, the aircraft flaps can be placed in four positions. A first zero-degree, or "up" position occurs where the flap is completely retracted. Second 15-degree and third 30-degree positions exist between he first position and a fourth 40-degree "full" position. The four flap positions are associated with and are commanded by four respective positions of a shifter lever in the flap handle-command module.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

A system is disclosed for changing positions of a control surface on an aircraft using a lever. The lever is included in a housing, the lever being mounted on an axle and having an activation top portion which extends out of the housing and actuates the lever, and a body; a biasing device configured to offer resistance to a compressive force applied axially when the lever is pushed down, the biasing device being located between a rigid portion of the lever and the axle; a locking pin protruding substantially transversely from the rigid portion of the lever such that the locking pin moves with the lever; a plurality of angularly spaced apart notches defined into the housing above the pin, each notch in the plurality representing a different position for a control surface of an aircraft when the pin is received in each of the notches in the plurality; a rocker mechanism pivotally mounted on the axle, the rocker mechanism being biased into an upright equilibrium state, the rocker mechanism including a plurality of upwardly extending teeth; at least one pin-receiving area defined between each of the plurality of teeth, the pin-receiving area being adapted to receive the pin from a first notch in the plurality when the lever is pushed down, and rotate such that the pin is then received within a second notch; and the rocker mechanism being limited to a range of angular rotation by a rotation-limiting arrangement.

In embodiments the axle passes transversely through a longitudinal slot formed into the body of the lever, and the axle is slidably mounted on a longitudinal pin mounted inside the slot, and the biasing member is a compression spring loosely mounted on the longitudinal pin above the axle thus compelling the activation portion of the lever outward relative to the housing. In further embodiments, the longitudinal pin is received up through an aperture formed in a longitudinal bore formed at the bottom of the body, the longitudinal bore being bored in line with the slot, the longitudinal pin received through the longitudinal bore, then through a transverse bore made through the axle, then through the compression spring, and the longitudinal pin is then secured into the slot. Further, longitudinal pin can penetrate substantially all the way through the longitudinal slot to the point a top end of the longitudinal pin abuts a top portion of the slot, and then is secured into the longitudinal slot by screwing in a plug into the longitudinal bore underneath a lower end of the longitudinal pin.

In embodiments, the system includes an indicating member extending down from the lever body, the indicating member configured to trigger a position sensor installed proximate the lever. The indicating member, depending on position, can be configured to trigger a plurality of position sensors.

The rocker mechanism, in embodiments, can include a pair of outwardly directed tension springs having tops attached to the bottom of the rocker mechanism, bottoms attached to a frame member below the rocker mechanism, and the tension springs serving to bias the rocker mechanism into the upright equilibrium state. A first notch in the plurality of notches can be configured to dictate a zero-degree control surface position, a second notch in the plurality can dictate a 15-degree control surface position, a third notch in the plurality can be configured to dictate a 30-degree control surface position, and a fourth notch in the plurality can be configured to dictate a 40-degree control surface position.

In embodiments, an aircraft flap lever system includes a housing including a lever; the lever on an axle supported in the housing; a pin on the lever, the lever and thus pin being biased upwards towards any of a plurality of radially-spaced notches defined in the housing, each notch resulting in a different lever setting, the upward bias locking the pin in place; and a rocker mechanism pivotally mounted on the axle, the rocker mechanism being biased into an upright equilibrium state, the rocker mechanism including a plurality of upwardly extending teeth, the rotation of the rocker mechanism being limited such that when the pin is moved to a different notch in the plurality it will not skip to a next notch in the plurality. There may also be at least one pin-receiving area defined between each of the plurality of teeth, the pin-receiving area being adapted to receive the pin when received from a given notch in the plurality, the pin can be rotated on the rocker mechanism to a position underneath a next notch, and then a release of the lever results in the pin being locked into the next notch.

In embodiments, an indicating member can be configured to trigger a sensor installed proximate the lever to indicate a position of the lever. Further, the indicating member, depending on position, can be configured to indicate a plurality of lever positions.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions, objects and features may be exaggerated for clarity.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

It has been recognized that with conventional flap levers, the pilot is able to skip through more than one lever position in one action. These levers are designed to lock from one position into the next, but pilots can accidentally or intentionally glide the lever two positions in one action which is not desirable. For example, abruptness in flap repositioning caused by this skip-over can result in flight irregularities, and even in some instances, create safety concerns.

A lever system is disclosed herein which ensures both: (i) ease in moving the lever from one position to the next; and (ii) an effective lock in each position while at the same time preventing position skip-over.

Figure 1:
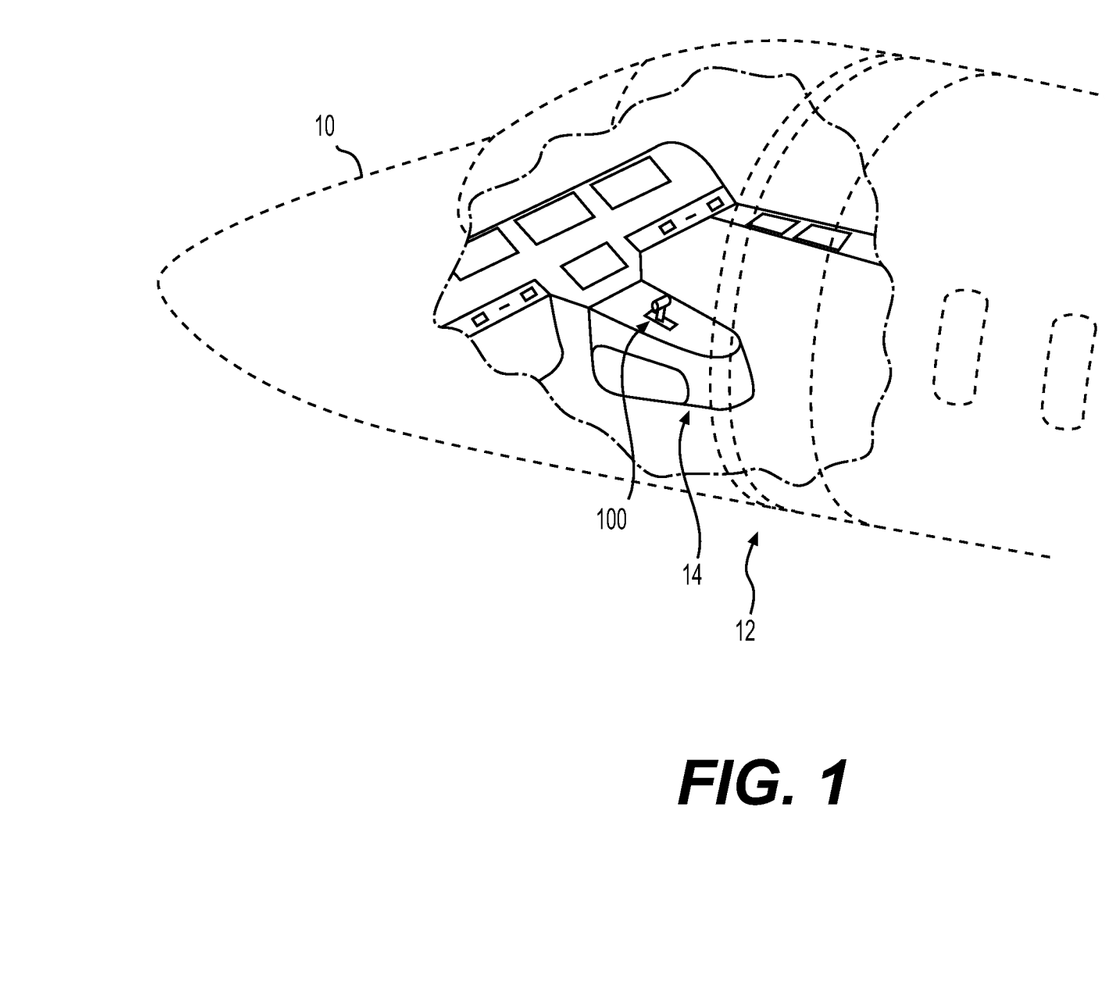
FIG. 1 shows an embodiment for an environment in which the disclosed lever system might be utilized.

FIG. 1 includes a schematic partially cut-away perspective view of a portion of a cockpit 12 of an aircraft 10 having a center pedestal 14 in which a flap position handle-command module 100, according to some exemplary embodiments, is located. Referring to FIG. 1, the flap position handle-command module 100 drops into center pedestal 100 as a self-contained module.

Figure 2:
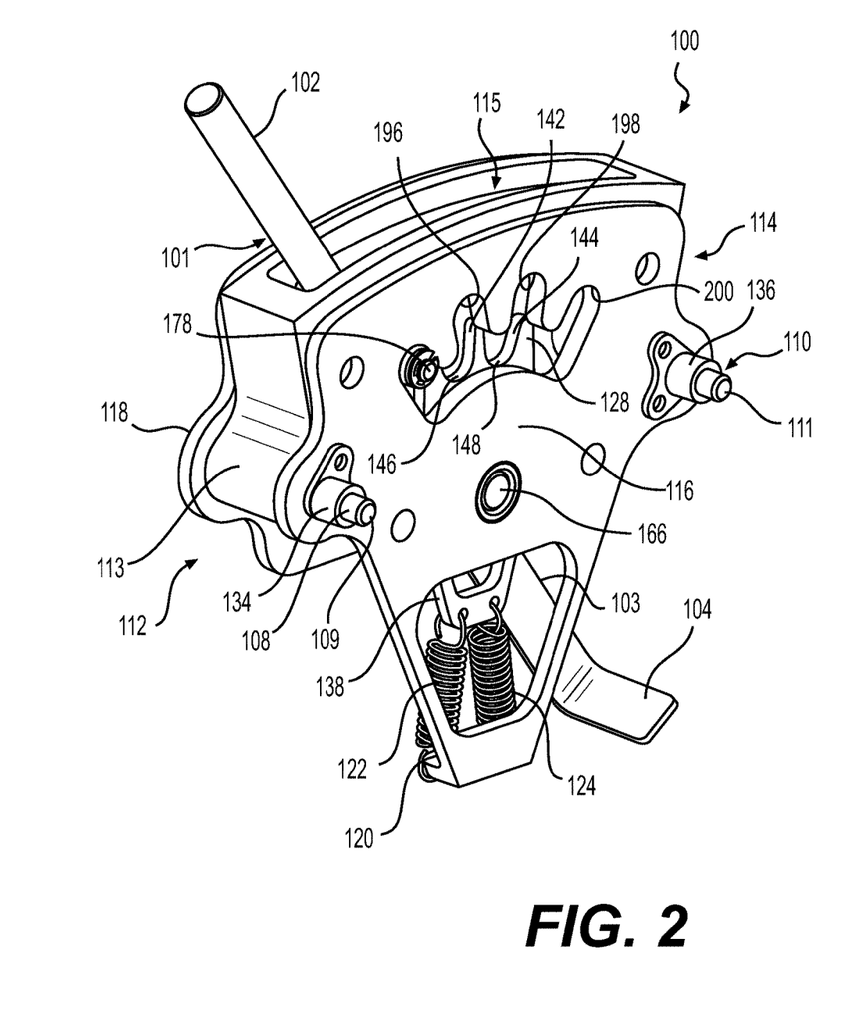
FIG. 2 shows a first side perspective view of the lever system.

A module configuration is disclosed. FIG. 2 shows the module 100 removed from the console. Module 100 includes a lever system 101 which has a handle end 102 and position indicator portion 103 having an inwardly angled end 104 which will ultimately be used to block one of a plurality of differently positioned proximity sensors to indicate an existing position of the lever and thus serve as a lever position indicator. Lever system 101, although it is configured to be longitudinally compressible, is rigid against angular rotation, and rotates about pivot axle 106.

The module 100 includes a housing that assembled using a first faster 108 and a second fastener 110. Of the two fasteners 108 and 110, only the fastener ends 109 and 111 are exposed in FIG. 2. End 108 is near a front 112 of the module 100. End 110 is near a back end 114 of module 100. The fastener heads (130 and 132) can be seen in FIG. 3. Frame plate 116 and concealing plate 118 are fastened together by the fasteners 108 and 110 to sandwich a spacing member 113. Fastener ends 109 and 111 are secured into threaded nut receptacles 134 and 136, which, in the disclosed embodiment are fixedly attached onto the frame plate 116 as shown in FIG. 2. The combined plates 116 and 118 along with the spacing member 113 when assembled together form a housing for the lever systems 101.

Figure 3:
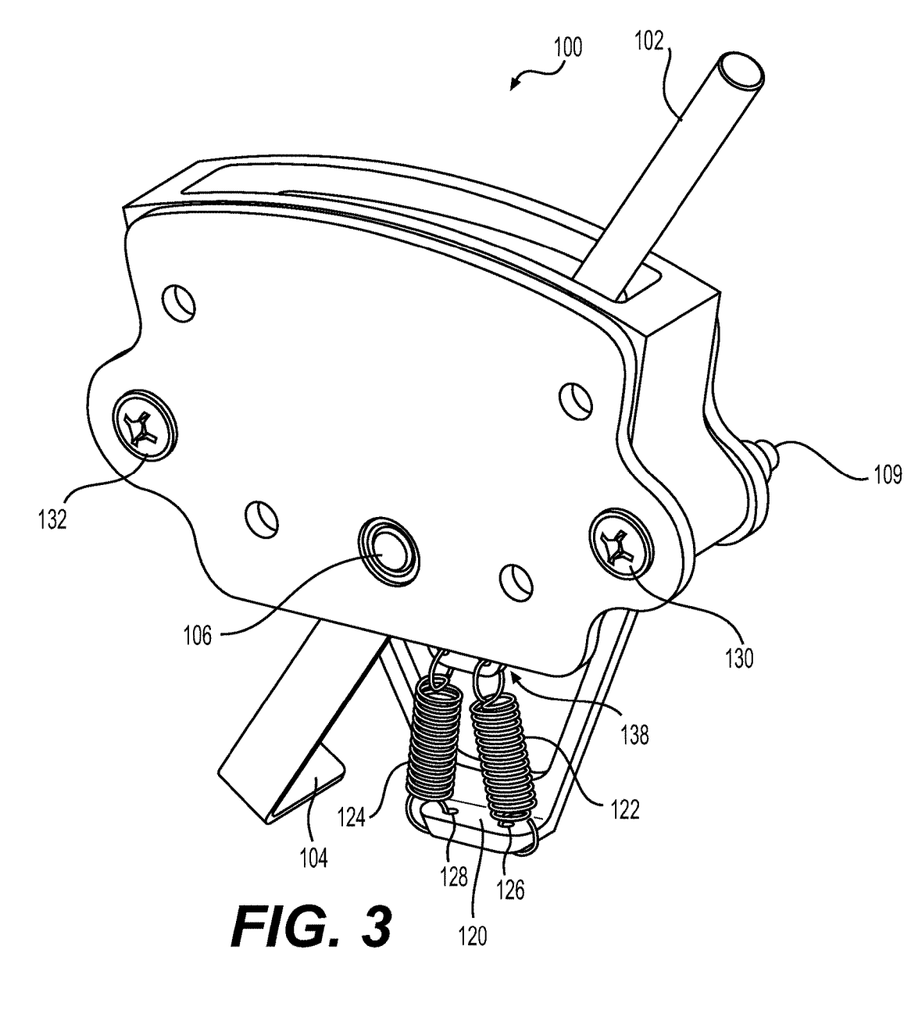
FIG. 3 shows an opposite side perspective view of the lever system.

Defined into a top surface of the spacing member 113 is an arched substantially rectangular slot 115 which allows for the angular rotation of lever 102. An inwardly extending shelf 120 (FIG. 3) exists at the bottom of the frame plate 116. Shelf 120 is used to receive first and second tension springs 122 and 124. As can be seen in FIG. 3, the bottom of each of springs 122 and 124 is received through vertically drilled bores 126 and 128, respectively, to be secured.

Figure 4:
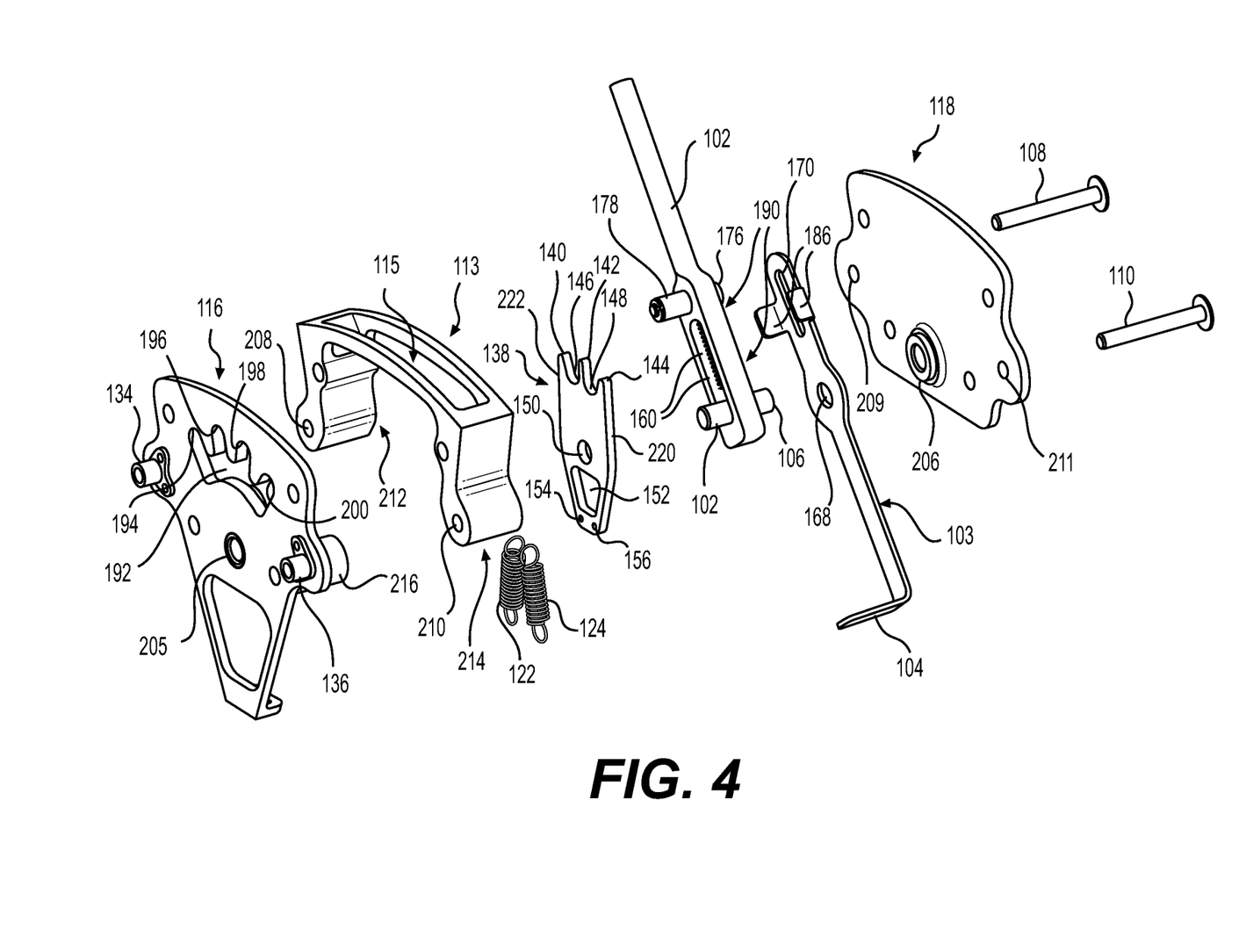
FIG. 4 shows a first side exploded view from the perspective shown in FIG. 2.
Figure 5:
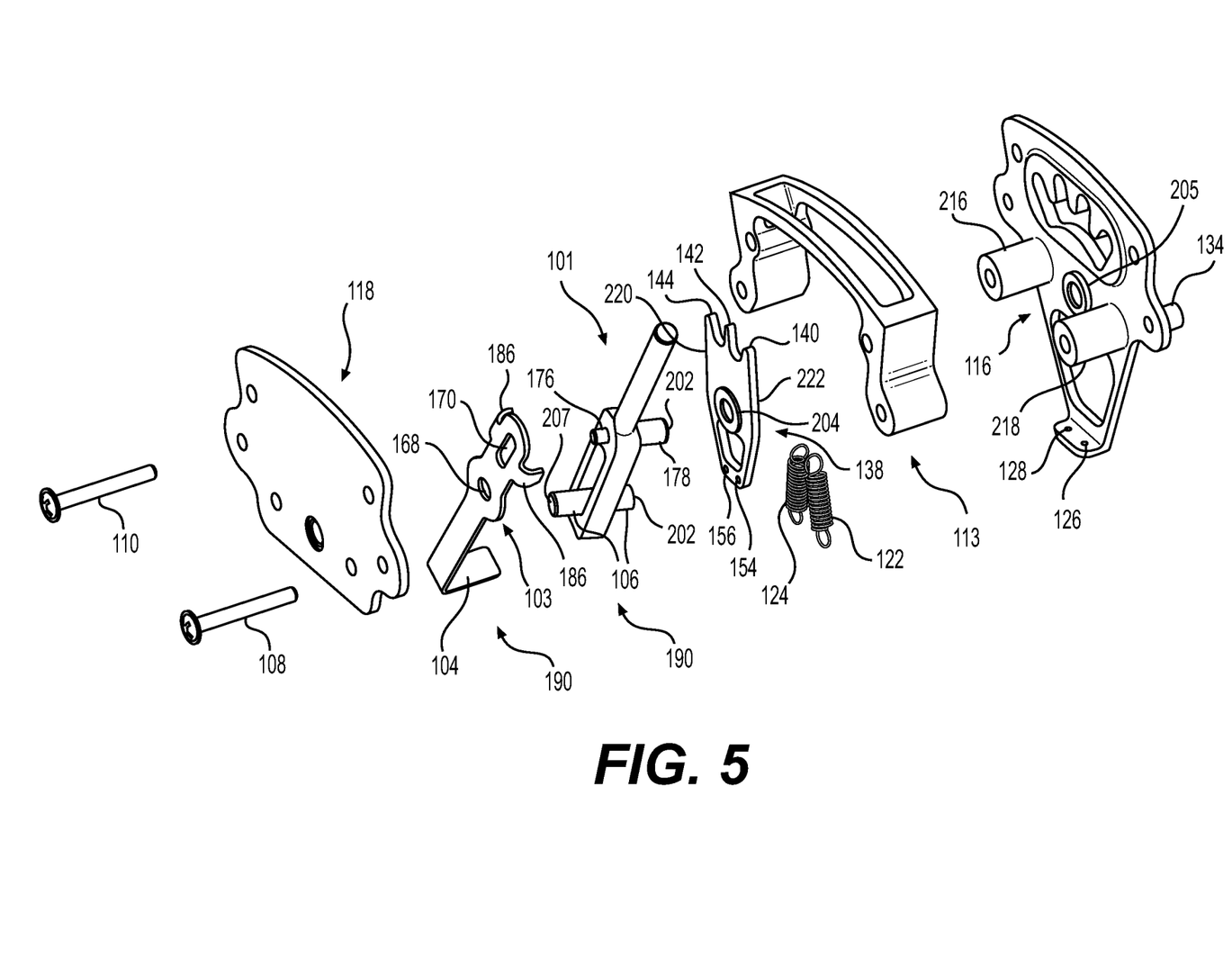
FIG. 5 shows an exploded view from the perspective shown in FIG. 3.

After assembly, a skip-over preventing rocker mechanism/plate 138, best seen in the exploded views of FIGS. 4 and 5, is rotatably mounted within the module 100 about the same axle 106 as is the lever 101. Rocker 138 includes three pointed teeth 140, 142, 144, defining therebetween two valleys 146 and 148, and is biased in an upright position by a biasing system which uses springs. More specifically, the biasing system includes springs 122 and 124, the tops of which are secured to holes 154 and 156 defined into the bottom of rocker 138. A hole 150 defined through rocker 138 is what axle 106 is received on. An open space 152 is defined into the rocker 138 for the purpose of minimizing material use.

Figure 6:
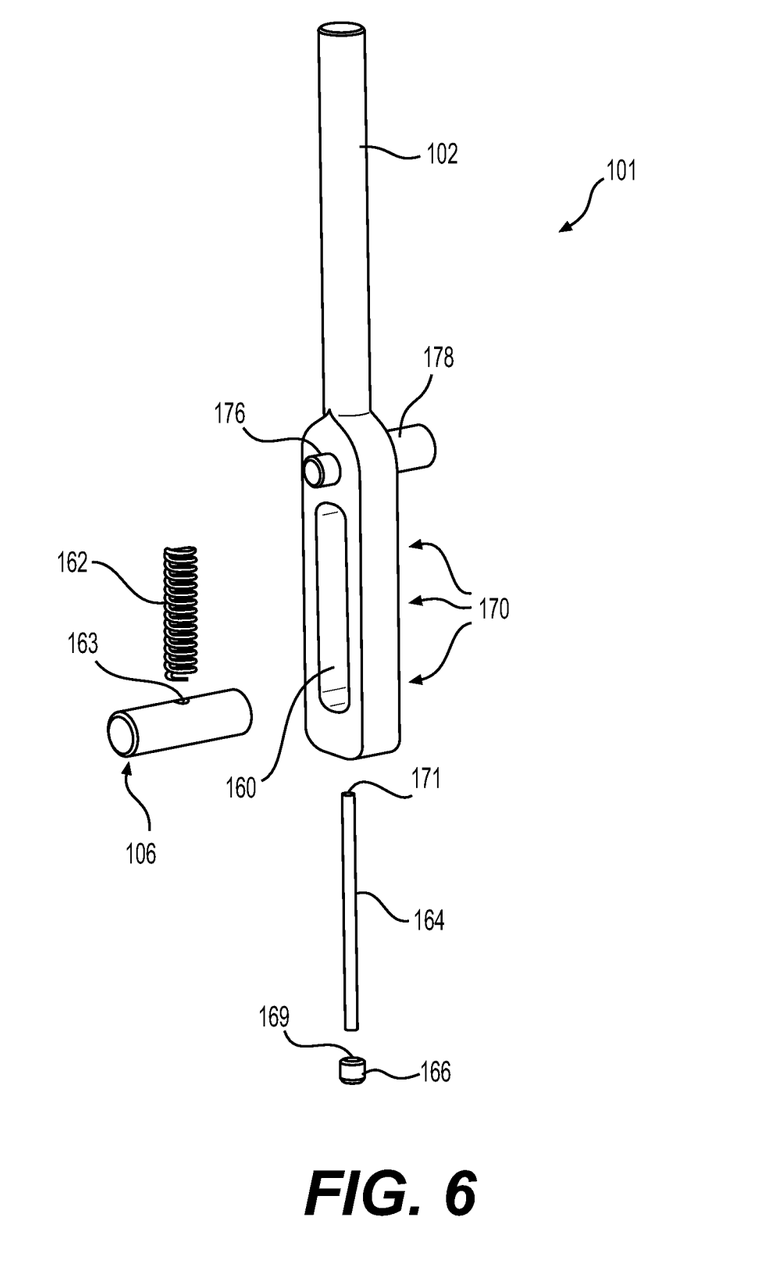
FIG. 6 shows an exploded view of the lever assembly.

A position indicating lever assembly is shown in an exploded view in FIG. 6. Referring to the figure, it can be seen that the handle portion 102 on the lever device 101 is cylindrical, but includes an enlarged portion 158 at its lower end. A pill-shaped vertical slot 160 is defined into the enlarged portion 158. Slot 160 is configured to receive a compression spring 162 therein. Spring 162 is axially contained by receiving it onto an axial pin 164 which is received into a recess 169 defined into a threaded cap 166. Pin is passed through a threaded bore (not shown) existing upward through at a bottom portion 167 of the enlarged section 158 of the lever device 101. The pin 164 is initially received into the recess 169 (which is sized to hold the pin) in the cap 166. As the pin 164 is slid up through the threaded bore, top end 171 becomes exposed in the slot 160, and then is passed through a transverse bore 163 defined through the axle 106. Once the end 171 is exposed above the axle 106, the spring 162 is able to be slid down onto the pin 164, and once the pin fully penetrates upward into the slot 160, the cap 166 can be tightly screwed into the bottom surface 167 fully securing the pin 164, axle 106, and compression spring 162 into the slot. The cap 166, upon full installation, will be flush with the bottom surface 167.

Now that the lever assembly 101 has been assembled, the position indicator component 103 is sandwiched between the enlarged portion 190 of the lever assembly and a bearing 206 on the back plate 118 (see FIGS. 4 and 5). A pin 176 is received through a longitudinal guide slot 170 defined through the upper end of the component 103. Two lateral securing wrap-around ears 186 will engage both sides of the enlarged portion 158, maintaining the indicator component 103 in alignment with the lever 101. On an opposite side of the lever assembly 101, a cylindrical outcropping 178 will function as a positioning pin.

Since axle 106 is made to be slidably mounted onto the pin 164, and because slots 160 and 170 enable longitudinal translation of axle 106, pressing down from the top of lever 102 results in a reduction in the overall length of the assembly of the lever assembly 101 and indicator component 103 (see FIGS. 4-5). And because spring 162 becomes compressed, it offers resistance against the downward depression. The cylindrical outcropping 178 then acts as a positioning pin receivable into any of the notches 194, 196, 198, and 200 (see FIG. 7) defined into an opening 192 created through frame 116, while the opposing teeth 140, 142, and 144 on rocker 138 cooperate to prevent skipthrough.

To complete the assembly, the now-assembled lever assembly 190 is installed. More specifically, handle end 102 is brought up through the rectangular opening 115, and then secured between the plate 116 and member 118. A first end 202 of the axle 106 is passed through an integral washer 204, then through hole 150 in the rocker 138, and finally received into a bearing 205 in plate 116. A second end 207 of axle 106 is received through aperture 168 in the indicator component 103, and then inside an opposing raised bearing 206 surface in member 118. Then bolts 108 and 110 are passed through holes 209 and 211 in back plate 118, and then through lateral bores 208 and 210 defined through opposing legs 212 and 214. Finally, each of bolts 108 and 110 are threadedly received into the threaded receptacle nuts 134 and 136 to complete the assembly.

Figure 7:
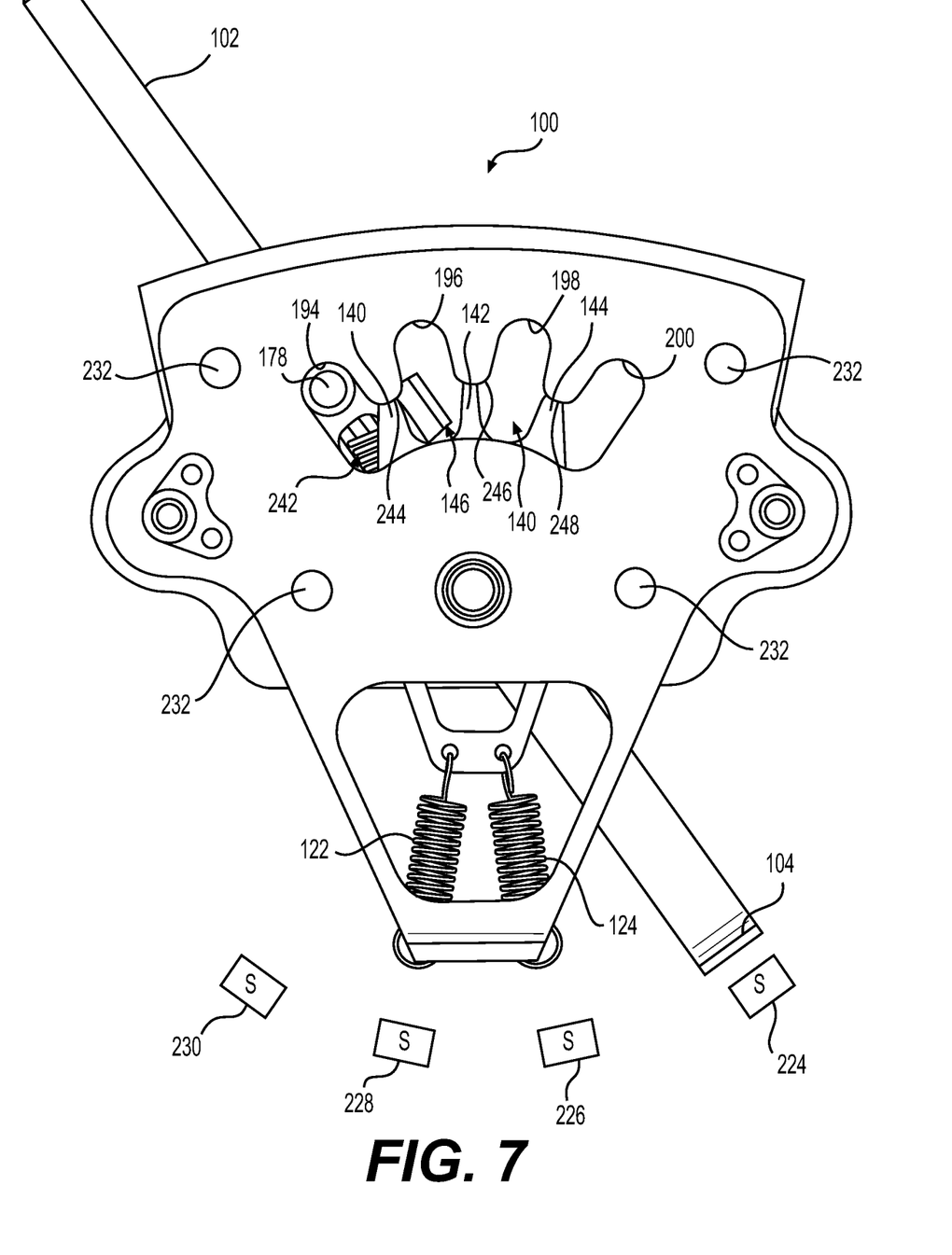
FIG. 7 shows a side view of the assembly.

The design includes rotation limiting features. A pair of rocker-limiting spacer cylinders 216 and 218 are formed on the inside surface of the frame plate 116. The rocker mechanism 138, which is installed between the cylinders 216 and 218, is limited by them against angular rotation. More specifically, laterally edges 220 and 222 of the rocker hit against the inside of each of cylinders 216 and 218. Additionally, when spring 122 is installed into holes 126 and 154, and spring 124 is installed into holes 128 and 156, the rocker 138 will be buoyed upward as shown in FIG. 7. It should be noted that even if one of the springs fails, e.g., becomes disconnected, the device will remain functional with only one spring until maintenance for the device is available.

A position monitoring system uses sensors. As can be best understood referencing FIGS. 2 and 7, there are four possible flap positions in the embodiment disclosed, and a locating of locking pin (cylindrical portion) 178 into: (i) notch 194 will impart an "up" or fully retracted position, (ii) notch 196 will impart a 15-degree flap position, (iii) notch 198 will impart a 30-degree flap position, and (iv) notch 200 will impart a full 40-degree flap position. Referring to FIG. 7, the positioning of each of the notches 194, 196, 198, or 200 will reciprocally result in inwardly extending position indicating member 104 blocking one of proximity sensors 224, 226, 228, and 230 respectively. As those in the art are aware, proximity sensors have been used with lever arrangements, and they are installed in the aircraft environment immediately radially outside of where the indicator component 103 and thus indicator 104 rotates as shown in FIG. 7. It should also be understood that a plurality of bores 232 are defined crosswise through the device 100 enabling it to be secured to the structures in the console 14 using fasteners (e.g., bolts, screws). Thus, the rotation of lever assembly 101 (comprised of lever 102 and indicator 104) occurs relative to the rest of the device 100 as well as relative to the stationary sensors 224, 226, 228, and 230 shown in FIG. 7.

The operation of the assembled device 100 involves first pressing down lever handle 102. This causes the locking pin 178 to move down out of the first notch 194 (up position; the pin position shown in FIG. 7) into a lower area 242 (see FIG. 7) to an extent that a downwardly depending portion 244 of the frame 116 is able to be cleared. This releases the lever 102 for angular movement in a clockwise direction (in FIG. 7). Upon rotation, the outside lateral surface of pin 178 bears against the outside edge of tooth 140, and rotates the rocker mechanism 138 clockwise to the right (clockwise in the view shown in FIGS. 2 and 7). Pin 178 can then be moved up into notch 196, which is a 15-degree flap position, assuming the pilot or other user is no longer depressing the top of lever 102. The release upward of the lever 102 locks the pin in place within notch 196, thus preventing any rotation of the lever 102. During the movement of pin 178 from notch 194 to notch 196, the lever cannot accidentally (or even intentionally) skip over into the next notch 198 prematurely. This is because rocker 138 is limited in its angular movement by a rotation limiting member (which in the disclosed embodiment is a cylinder 216; see FIG. 5). As seen earlier, the cylinder 216 is formed and exists internal to the assembly and limits the rotation clockwise (in FIG. 7) movement direction by abutment. As pin 178 is been released up into notch 196, it clears the upper tip of the tooth 140, the spring biasing (created by springs 122 and 124) causes the rocker 138 to go back (by counter clockwise rotation in FIG. 7) to a completely upright, equilibrium position (the position shown in FIG. 7).

If (and when) the pilot desires to increase the flap angle from the 15 degree position to a 30-degree position, he or she depresses lever 102. As the lever top is depressed, pin 178 moves down into the valley 146 defined between teeth 140 and 142. Once a downwardly-depending portion 246 is cleared, the user is able to move the lever clockwise towards a 30-degree position into notch 198. There can be no skip into the next notch 200 prematurely because rocker 138 is limited against clockwise movement by cylinder 216. When lever is no longer depressed, and thus, pin 178 is released up into the 30-degree position of notch 198, the rocker will again return to upright equilibrium position once the top of tooth 142 is cleared.

A subsequent move from notch 198 into full 40-degree notch 200 will involve (i) a downward depression of lever 102; (ii) a consequential lowering down of pin 178 into the second valley 148 (which upon the return of the rocker 138 to equilibrium is in position immediately below notch 198) defined in the rocker 138; (iii) a clockwise rotation of the lever 102 once pin 178 has cleared a downwardly projecting portion 248; and (iv) a securement of the lever pin 178 up into notch 200 when the formerly depressed top of lever 102 is released, the raising of pin 178 to clear the top of tooth 144 causing the release of rocker 138 to equilibrium.

From the 40-degree flap position dictated by the lever 178 being locked into notch 200, it is also possible to return the lever to the 30, 15, and zero-degree positions (established by securement into notches 198, 196, and 194, respectively) by reversing the same steps, but moving in the opposite angular direction.

For example, to unlock the lever pin 178 from notch 200, the user presses down lever handle 102. This causes the locking pin 178 to move out of notch 200 back down to an extent that the downwardly depending portion 248 of the frame 116 is able to be cleared. This releases the lever 102 for angular movement in a counter-clockwise direction (in FIG. 7). Upon rotation, the inside lateral surface of pin 178 bears against the outside edge of tooth 144 on the rocker, and rotates the rocker mechanism 138 clockwise to the right (clockwise in the view shown in FIGS. 2 and 7). Pin 178 can then be moved up into notch 198, which is the 30-degree flap position. A release upward of the lever 102 locks the pin in place within notch 198. Again here, but in the reverse counter-clockwise direction, the movement of pin 178 from notch 200 to notch 198 does not risk the lever skipping over into the next notch 196 prematurely. This is because rocker 138 is limited in its angular movement in the counter-clockwise direction by cylinder 218 (see FIG. 5). Like cylinder 216, cylinder 218 is assembled into the lever system 100 and limits the rotation counter-clockwise (in FIG. 7) movement direction.

As pin 178 enters notch 196, it clears the upper tip of the tooth 144, and the spring biasing (created by springs 122 and 124) causes the rocker 138 to snap back in a clockwise rotation (as viewed in FIG. 7) to the completely upright, equilibrium position.

If (and when) the pilot desires to increase the flap angle from the 30 degree position back to the 15-degree position, depressing lever 102 moves pin 178 down into the valley 148 defined between teeth 142 and 144. Once downwardly-depending portion 246 is cleared, the lever can be moved counter-clockwise into 15-degree position notch 196. Again here, there is no possibility of skipping ahead to notch 194 prematurely because rocker 138 is limited against clockwise movement by cylinder 218. When lever is no longer depressed, and thus, pin 178 is released up into the 15-degree position of notch 196, the rocker will again return to upright equilibrium position once the top of tooth 142 is cleared.

A subsequent move from notch 196 into zero-degree notch 194 is accomplished by: (i) pressing down lever 102 thus dropping pin 178 into the valley 146 (which upon the return of the rocker 138 to equilibrium is in position immediately below notch 196) defined in the rocker 138; (ii) a counter-clockwise rotation of the lever 102 once pin 178 has cleared a downwardly projecting portion 244; and (iii) securement of the lever pin 178 up into notch 194 when the formerly depressed top of lever 102 is released, which causes the pin 178 to clear the top of tooth 140 causing the release of rocker 138 to equilibrium and resulting in the lever 102 being in the original zero-degree setting.

The angular rotation of rocker 138 is contained within the bounds of the two, because it is contained within the cylinders 216 and 218 formed into the housing. Effectively, whenever pin 178 is in one of the outside slots 194 or 200, movement into either of the inside slots 196 or 198 causes the rocker 138 to move aside and allow the pin 178 into the new slot. In such a case, however, the rocker is prevented from over rotating by one of the limit-setting cylinders 216 and 218. Whenever the pin is moved from one of the two inside slots 196 or 198 into another slot, the rocker 138 receives pin 178 into one of the two receiving areas 146 or 148, and then releases the pin into the new slot.

Any movement of the lever 102 back in the counter clockwise direction (in FIG. 7) direction from full to zero occurs in the same manner, with the rotation of the rocker 138 being limited against over-rotation by the cylindrical member 218 in each repositioning.

The allowed angular rotation in either direction by the rocker 138 is about the same as the extent of the angle between the axis of rotation between each of the teeth on the rocker. Because of that, the pin is unable to skip over any position.

While the present disclosure has shown and described exemplary embodiments, it will be understood by those of ordinary skill in the art that various changes in form and details may be made therein without departing from the spirit and scope of the present disclosure, as defined by the following claims.

The invention claimed is:

1. A system for changing positions of a control surface on an aircraft, the system comprising:
    a lever included in a housing, the lever being mounted on an axle and having an activation top portion which extends out of the housing and actuates the lever, and a body;
    a biasing device configured to offer resistance to a compressive force applied axially when the lever is pushed down, the biasing device being located between a rigid portion of the lever and the axle;
    a locking pin protruding substantially transversely from the rigid portion of the lever such that the locking pin moves with the lever;
    a plurality of angularly spaced apart notches defined into the housing above the pin, each notch in the plurality representing a different position for a control surface of an aircraft when the pin is received in each of the notches in the plurality;
    a rocker mechanism pivotally mounted on the axle, the rocker mechanism being biased into an upright equilibrium state, the rocker mechanism including a plurality of upwardly extending teeth;
    at least one pin-receiving area defined between each of the plurality of teeth, the pin-receiving area being adapted to receive the pin from a first notch in the plurality when the lever is pushed down, and rotate such that the pin is then received within a second notch; and
    the rocker mechanism being limited to a range of angular rotation by a rotation-limiting arrangement.

2. The lever system of claim 1 wherein:
    the axle passes transversely through a longitudinal slot formed into the body of the lever, and the axle is slidably mounted on a longitudinal pin mounted inside the slot, and
    the biasing member is a compression spring loosely mounted on the longitudinal pin above the axle thus compelling the activation portion of the lever outward relative to the housing.

3. The lever system of claim 2 wherein the longitudinal pin is received up through an aperture formed in a longitudinal bore formed at the bottom of the body, the longitudinal bore being bored in line with the slot, the longitudinal pin received through the longitudinal bore, then through a transverse bore made through the axle, then through the compression spring, and the longitudinal pin is then secured into the slot.

4. The lever of claim 3 wherein the longitudinal pin penetrates substantially all the way through the longitudinal slot to the point a top end of the longitudinal pin abuts a top portion of the slot, and then is secured into the longitudinal slot by screwing in a plug into the longitudinal bore underneath a lower end of the longitudinal pin.

5. The lever of claim 1 comprising:
an indicating member extending down from the lever body, the indicating member configured to trigger a position sensor installed proximate the lever.

6. The lever of claim 5 wherein the indicating member, depending on position, is configured to trigger a plurality of position sensors.

7. The lever of claim 1 wherein the rocker mechanism further comprises:
a pair of outwardly directed tension springs having tops attached to the bottom of the rocker mechanism, bottoms attached to a frame member below the rocker mechanism, and the tension springs serving to bias the rocker mechanism into the upright equilibrium state.

8. The lever of claim 1 wherein a first notch in the plurality of notches is configured to dictate a zero-degree control surface position, a second notch in the plurality dictates a 15-degree control surface position, a third notch in the plurality is configured to dictate a 30-degree control surface position, and a fourth notch in the plurality dictates a 40-degree control surface position.

9. The lever of claim 1 wherein:
the lever housing is configured so that when the locking pin is moved down out of the first notch and moved towards the second notch, bears against a left outside edge of a first tooth and rotates the rocker mechanism clockwise where a right edge of the rocker mechanism engages a forward rotation limiting member configured into the housing, the forward rotation limiting member being a component of the said rotation-limiting arrangement, the forward rotation limiting member preventing the locking pin from skipping over into a third notch as the pin is moved into the second notch.

10. The lever of claim 9 wherein:
the lever housing is configured such that once the pin is raised up into the second notch due to lever release, the pin clears a top of the first tooth and the rocker is moved back into the upright equilibrium state.

11. The lever of claim 10 wherein:
the lever housing is configured such that when the lever pin is moved down due to downward pressure on the lever out of the second notch, the pin is received into a receiving area defined between the first tooth and a second tooth, can then be rotated clockwise by lever motion towards the third notch at such time the right edge of the rocker mechanism engages the stop member preventing skipping past the third notch, and the pin is able to be raised and locked into the third notch due to a release of the lever.

12. The lever of claim 11 wherein:
the lever housing is configured such that once the pin is raised up into the third notch due to lever release, the pin clears a top of the second tooth, and the rocker is moved back into the upright equilibrium state.

13. The lever of claim 12 wherein:
the lever housing is configured such that when the lever pin is moved down due to downward pressure out of the third notch, the pin is received into a receiving area defined between the second tooth and a third tooth atop the rocker, and then the lever can be rotated clockwise by lever motion towards a fourth notch and be locked up into the fourth notch upon a release of the lever.

14. The lever of claim 13 wherein:
the lever housing is configured such that once the pin is raised up into the fourth notch due to lever release, the pin clears a top of the third tooth, and the rocker is moved back into the upright equilibrium state.

15. The lever of claim 14 wherein the lever and housing are configured such that when a user returns the locking pin from the fourth notch to third then second then first notches, the mechanical arrangement works in substantially identical but opposite way.

16. The lever of claim 14 wherein:
the lever housing is configured so that when the locking pin is moved down out of the fourth notch and moved back towards the third notch, the pin bears against the right outside edge of the third tooth and rotates the rocker mechanism counter-clockwise where the left edge of the rocker mechanism engages a reverse rotation limiting member configured into the housing, the reverse rotation limiting member being a component of the said rotation-limiting arrangement, the reverse rotation limiting member preventing the locking pin from skipping past the third notch.

17. An aircraft flap lever comprising:
a housing including a lever;
the lever on an axle supported in the housing;
a pin on the lever, the lever and thus pin being biased upwards towards any of a plurality of radially-spaced notches defined in the housing, each notch resulting in a different lever setting, the upward bias locking the pin in place;
a rocker mechanism pivotally mounted on the axle, the rocker mechanism being biased into an upright equilibrium state, the rocker mechanism including a plurality of upwardly extending teeth, the rotation of the rocker mechanism being limited such that when the pin is moved to a different notch in the plurality it will not skip to a next notch in the plurality.

18. The aircraft flap lever of claim 17 comprising:
at least one pin-receiving area defined between each of the plurality of teeth, the pin-receiving area being adapted to receive the pin when received from a given notch in the plurality, the pin can be rotated on the rocker mechanism to a position underneath a next notch, and then a release of the lever results in the pin being locked into the next notch.

19. The lever of claim 17 comprising:
an indicating member configured to trigger a sensor installed proximate the lever to indicate a position of the lever.

20. The lever of claim 19 wherein the indicating member, depending on position, is configured to indicate a plurality of lever positions.

* * * * *